Nov. 28, 1961    ÅKE H. P. BLOMQVIST    3,011,108
SERVO SYSTEM FOR CONTROLLING A FOLLOWER MEMBER
Filed Aug. 17, 1959                     2 Sheets-Sheet 1
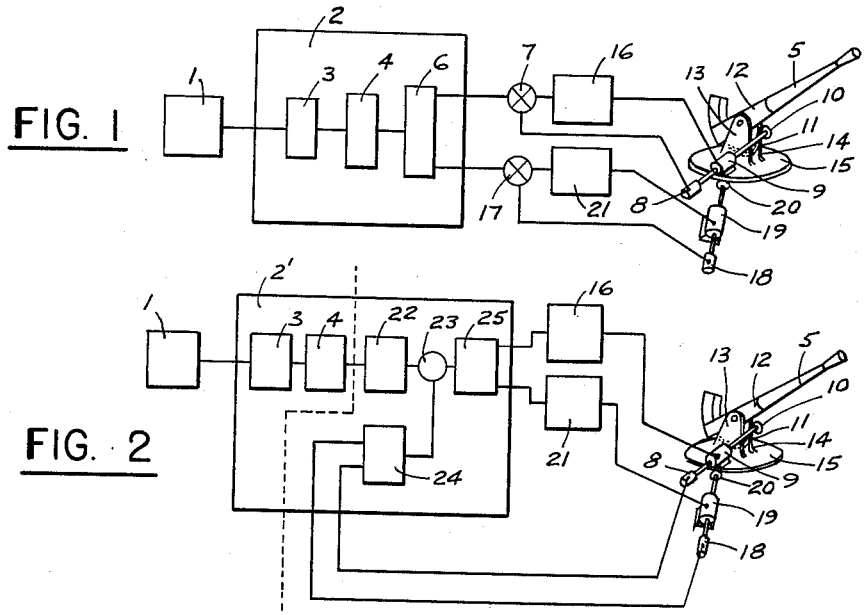
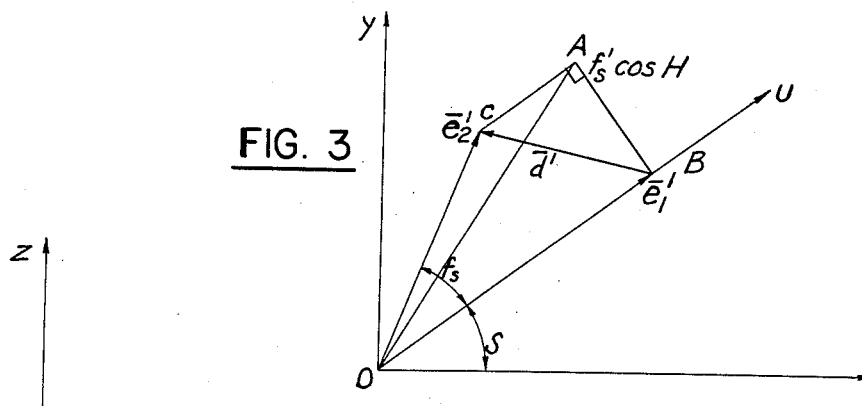
INVENTOR.
ÅKE HUGO PETRUS BLOMQVIST
BY Hane and Nydick
ATTORNEYS

United States Patent Office 3,011,108
Patented Nov. 28, 1961

3,011,108
SERVO SYSTEM FOR CONTROLLING A FOLLOWER MEMBER
Åke Hugo Petrus Blomqvist, Johanneshov, Sweden, assignor to Aktiebolaget Bofors, Bofors, Sweden, a corporation of Sweden
Filed Aug. 17, 1959, Ser. No. 834,138
Claims priority, application Sweden Aug. 23, 1958
4 Claims. (Cl. 318—19)

The present invention relates to a servo or follow-up system for controlling the movement and position of a controlled or follower member by a remote control or pilot member, and more particularly to a servo or follow-up system for the control of a controlled or follower member which is movable in two different directions, generally at a right angle to each other.

The invention may be utilized in many fields of application. A field in which the invention may be particularly advantageously used is the training of a barrel of a gun for elevating and traversing. Another advantageous field is the control of the beam of a hoisting crane or derrick which must be directed in horizontal and vertical direction.

In the aforelisted fields of application and in other fields, it is highly desirable that the controlled or follower member can be positioned with high accuracy. Systems for the purpose, as heretofore known, have been found not to be sufficiently accurate, especially for the training of a gun barrel unless the systems are so complex that they are not practical.

Accordingly, it is the broad object of the present invention to provide a novel and improved servo system for controlling the follower member from a pilot member which affords a high accuracy without making the system unduly complex. In other words, the basic object of the invention resides in providing a servo system which combines accuracy with simplicity.

Other and further objects, features and advantages of the invention will be pointed out hereinafter and set forth in the appended claims forming part of the application.

In the accompanying drawing, several preferred embodiments of the invention are shown by way of illustration and not by way of limitation.

In the drawing:

FIG. 1 shows diagrammatically a prior art servo system for controlling the training of a gun barrel from a remote fire control station.

FIG. 2 is a similar block diagram of a servo system according to the invention.

FIGS. 3 and 4 are vector diagrams showing the vectors utilized in the system of FIG. 2.

Figure 5:
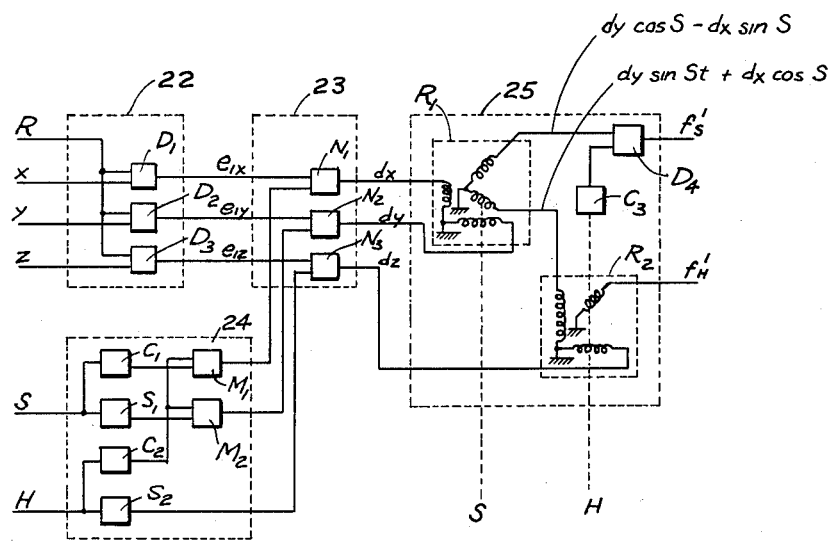
FIG. 5 is a block diagram showing in detail a modification of part of the servo system according to FIG. 2.

A servo system as heretofore known for controlling the elevating and traversing of a gun barrel is shown in FIG. 1 in which 1 is a gun sight, by means of which the position of a target in space is measured. The sight may be a radar sight, or any other conventional sight. The sight is connected to a fire-control instrument 2. The sight and fire-control instrument together constitute the controlling member for the servo system. The fire-control instrument 2 contains a part 3 to which are fed data measured by the sight, namely the angle of elevation, angle of traverse and the range. In the part 3 the said data are converted from polar coordinates into Cartesian coordinates. The last-mentioned coordinates are transmitted to a part 4 in the fire-control instrument. The part 4 is a hitting point computer. The output values from said part 4 indicate the point in space upon which a gun barrel 5 is to be directed.

As the barrel cannot be directed with the aid of signals representing the Cartesian coordinates of the aiming point, the part 4 must be connected to a part 6, which constitutes a coordinate converter. In this part, the Cartesian coordinates for the aiming point are converted into polar coordinates, i.e., the angle of elevation and the angle of traverse which is to be fed to the barrel 5. A signal representing the last-mentioned angle of elevation is fed to a differential unit 7 which is also connected to an indicating device 8. This unit is coupled with the driving device 9 which by means of its gear 10 is connected with a toothed section 11 fixed to barrel 5. This barrel 5 has a breech ring 12 which is supported in two mounting standards 13 and 14 fixed to a platform 15. Indicator 8 indicates the momentary angle of elevation of the barrel 5. If this angle of elevation does not correspond to the angle of elevation fed to the differential unit 7 from converter 6, a difference signal is obtained in the differential unit. This signal is fed to an amplifier 16 connected with a driving device 9 which sets the barrel at an angle corresponding to the angle obtained from the part 6.

In the same manner the signal from the part 6 corresponding to the angle of traverse is fed to a differential unit 17. In addition, a signal from an indicating device 18 connected with a driving device 19 which drives a gear 20 is fed to the differential unit 17. The gear 20 is in mesh with a toothed rim on platform 15. The indicator 18 indicates the momentary angle of traverse of the barrel 5. If the angle of traverse of the barrel does not correspond to the angle of traverse obtained from part 6, a signal is formed in the differential unit 17 which is fed to an amplifier 21. This amplifier in turn is connected with driving device 19 so that the barrel is traversed to conform with the angle from the part 6. As is evident, the drive means for elevating and traversing the gun barrel are shown in diagrammatic form only.

When directing a gun, it is of course desirable to obtain as great a training accuracy as possible. The above-described apparatus is inherently incapable of delivering the desired maximum accuracy. This is due to the fact that the two coordinate converters 3 and 6 limit the obtainable accuracy. An attempt to re-design the coordinate converters so that the desired accuracy is obtained, results in apparatus so complicated that it is not practical. The coordinate conversion is also a disadvantage if it would be attempted to apply a digital computer to an apparatus according to FIG. 1. The equations required for the coordinate conversion would then become very complicated.

The present invention overcomes the difficulties which arise in conjunction with an increase of the setting accuracy of a gun in the above-mentioned apparatus, by introducing vectors.

According to the invention, there is provided in a servo system for a control member and a controlled member in which said two members each can be adjusted in two directions at right angles to each other and in which the controlled member is provided with an indicating device for each direction indicating the postion of the controlled member in the setting direction and with driving devices for effecting its adjustment, a control member which supplies controlling values having the characteristic of a vector, a coordinate converter connected to said two indicating devices and producing a vector of the same length as the first-mentioned vector and with an orientation corresponding to the setting values supplied from the two indicating devices, a differential unit connected to the coordinate converter and to the controlling member, a component divider connected to the differential unit to divide the difference vector formed in the divider in such a way that the components of said difference vector along the directions of movement are obtained, said component divider being connected to a driving device for one of the directions so that one of the part components is transmitted thereto and also to the driving device for the other direction so that the other part component is transmitted to the latter driving device.

According to a variation of the invention the servo system contains a first multiplication member arranged between the controling member and the differential unit for multiplying the vector supplied to said unit to alter the length thereof.

According to a further variation of the invention the coordinate converter forms a vector which has the same length as the vector multiplied in the multiplication member.

According to a still further variation of the invention the servo system is provided with a second multiplication member arranged between the differential unit and the component divider to multiply the difference vector supplied to it to alter the length of said vector.

Turning now to FIG. 2, the same components are designated by the same reference numerals. The apparatus of FIG. 2 comprises the sight 1 and the fire-control instrument designated 2' because of its having a somewhat different construction. The fire-control instrument 2' comprises the coordinate converter 3 and the hitting point computer 4. The hitting point computer 4 is connected to a unit 22 in which the Cartesian coordinates for the aiming point are divided by the distance to the aiming point thereby forming a unit vector. This vector is fed to a differential unit 23 which is connected to a unit 24 to which are also fed the momentary values of the indicators 18 and 8. The driving devices, gun barrel and platform with associated parts are identical to the corresponding parts in the foregoing figure. In the unit 24, a unit vector is formed from the values supplied. The difference between the unit vector formed in the unit 24 and the one formed in the unit 22 is fed to a component divider 25 in which the difference vector is divided into two part vectors falling in the two setting directions, i.e., vertically and horizontally. The signal representing the two part vectors is fed to the two amplifiers 16 and 21. The two driving devices 9 and 19 will then train the barrel 6 until the difference vector has obtained the value of zero.

In the following, the theoretical data for the functioning of the units 22 to 25 will be explained.

In the unit 22 the unit vector $\bar{e}_1$ for the aiming point is formed by dividing the coordinates $x$, $y$ and $z$ of the aiming point by the distance R to the aiming point.

The coordinates of the unit vector will then be:

$$e_{1x} = \frac{x}{R}$$

$$e_{1y} = \frac{y}{R}$$

$$e_{1z} = \frac{z}{R}$$

In the coordinate converter 24 a unit vector $\bar{e}_2$ is formed on the basis of the angle of elevation H supplied from the indicator 8 and the angle of traverse S supplied from the indicator 18, and the coordinates of the unit vector are then obtained from the following equations:

$$e_{2x} = \cos H \cdot \cos S$$
$$e_{2y} = \cos H \cdot \sin S$$
$$e_{2z} = \sin H$$

In the differential unit 23 the difference between the two unit vectors is developed in the form of the projected length $\bar{d}$ of the difference vector along the different coordinate axes, as follows:

$$d_x = e_{2x} - e_{1x}$$
$$d_y = e_{2y} - e_{1y}$$
$$d_z = e_{2z} - e_{1z}$$

The functioning of the component divider 25 will be described in conjunction with FIGURES 3 and 4. FIGURE 3 shows the horizontal XY plane on which the vectors $\bar{e}_1$, $\bar{e}_2$ and $\bar{d}$ have been projected, and in the plane the vectors are designated $\bar{e}_1'$, $\bar{e}_2'$ and $\bar{d}'$. The points at the projections of the vectors $\bar{e}_1$ and $\bar{e}_2$ have been designated B and C. Orgin in the XY plane is designated O. The angle of traverse S is the angle between the X axis and the vector $\bar{e}_1'$ and the correct error angle $f_S$ is the angle between the vectors $\bar{e}_1'$ and $\bar{e}_2'$. In FIGURE 3 a line AB is at right angles to the vector $\bar{e}_1'$ and a line CA is parallel to the vector $\bar{e}_1'$. The distance AB will then be equal to $f_S' \cdot \cos H$, where $f_S'$ is an approximate value of the error angle obtained through the following equation:

$$f_S' = \frac{1}{\cos H} (\cos S \cdot d_y - \sin S \cdot d_x)$$

As the length of the vector $\bar{e}_1'$ is $\cos H$, the angle AOB will be equal to arc tan $f_S$. If the servo systems are functioning normally when elevating and traversing, the length of the error vector $\bar{d}$ will be small. The points A and C will then nearly coincide, and the approximate value $f_S'$ of the error angle will then, with good accuracy, be equal to the actual $f_S$. When the error angle $f_S$ is not small which is the case during a turning operation, it is sufficient for the functioning of the system that $f_S'$ is formed approximately. It is only at the end of the turning operation that the approximation should be changed to accuracy.

FIGURE 4 shows a vertical plane which contains the Z axis and the vector $\bar{e}_1$. The horizontal coordinate in this plane is designated U. This axis is in the XY plane and is shown also in FIGURE 3 in which it has the same direction as the projection of the vector $\bar{e}_1$. In FIGURE 4 there are also shown the projections $\bar{e}_2''$ and $\bar{d}''$ of the vectors $\bar{e}_2$ and $\bar{d}$. The point of the vector $\bar{e}_1$ is designated E and the projection of the point of vector $\bar{e}_2$ with F. Orgin in the ZU plane is designated O. The angle of elevation H is the angle between the U axis and the vector $\bar{e}_1$ and the correct error angle $f_H$ is the angle between the vector $\bar{e}_1$ and the projection of the vector $\bar{e}_2$. In FIGURE 4, a line DE is at right angles to the vector $\bar{e}_1$ and a line FD is parallel to the vector $\bar{e}_1$. The distance ED will then be equal to $f_H'$, where $f_H'$ is an approximate value of the error angle obtained through the following equation B.

$$f_H' = -\sin H(\sin S \cdot d_y + \cos S \cdot d_x) + \cos H \cdot d_z$$

In FIGURE 5 there is shown an example of a practical embodiment of units 22, 23, 24 and 25. According to the figure, the units comprise parts of an instrument of the analog type. The designs of the parts comprised in the instrument are well-known and are described in the literature, e.g. in the book "Electronic Analog Computers," Second Edition, New York, 1956, by G. A. Korn and T. M. Korn. In this book, adding and subtraction units are described on pages 12–15, multiplication units on pages 16–17, division units on pages 338–340, and the unit for the calculation of the sine and cosine functions and coordinate conversions on pages 329–338. The unit 22 in FIGURE 5 comprises three division units, $D_1$, $D_2$, and $D_3$, the input magnitudes of which comprise the vector components $x$, $y$ and $z$ for the aiming point and the distance R to the same. The output magnitudes from the unit 22 comprise the components to the vector $\bar{e}_1$. The unit 24 comprises the sine units $S_1$ and $S_2$ and the cosine units $C_1$ and $C_2$ which calculate the sine and cosine for the angles of elevation and traverse obtained from the indicators 8 and 18. Further, there are two multiplication units $M_1$ and $M_2$. The output magnitudes from the unit 24 comprise the components of the unit vector $\bar{e}_2$. The differential unit 23 including three subtraction units $N_1$, $N_2$, and $N_3$ forms the difference between the vectors $\bar{e}_1$ and $\bar{e}_2$ and has as output magnitude the components $d_x$, $d_y$ and $d_z$ of the vector $\bar{d}$. The unit 25 contains two resolvers $R_1$ and $R_2$, the rotors of which are turned to angles corresponding to the traverse and elevation angles of the barrel 5. There is also a cosine unit $C_3$ and a division unit $D_4$. The output magnitudes thereof constitute the approximate error angles $f_S'$ and $f_H'$.

Figure 6:
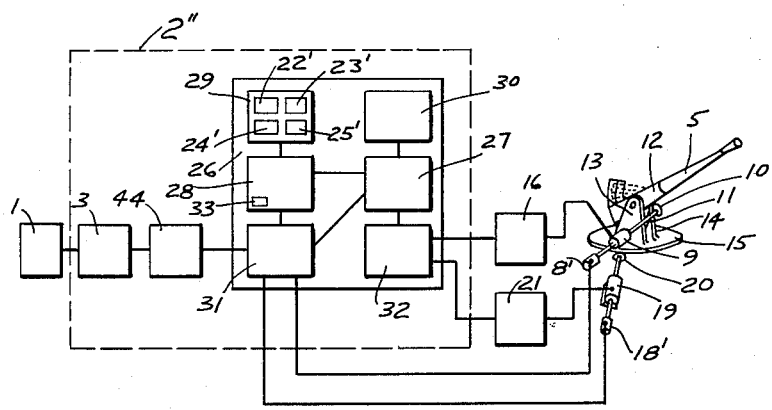
FIG. 6 is a block diagram of a further modification of the servo system.

Another embodiment of the invention is shown in FIGURE 6 in which the units 22, 23, 24 and 25 are replaced by a digital computer 26 employing binary numbers. The computer comprises an arithmetical unit 27, a control unit 28, a program unit 29, a memory unit 30, an input unit 31 and an output unit 32. The fire-control instrument itself is designated 2″. Otherwise, the system corresponds to the system of FIGURE 2, and the parts which are identical to the parts in the last-mentioned figure are therefore designated by the same reference characters.

The input unit 31 is connected to the hitting point computer, to the indicating devices 8′ and 18′ and to the arithmetical unit 27 which is controlled by the control unit 28. The input unit 31 converts the voltages received from the hitting point computer 4 and from the indication devices 8′ and 18′ to binary numbers of the form used in the computer. The manner in which this may be effected is described more in detail on pages 5–38 to 5–70 in the book "Control Engineering Handbook," New York, 1958, by Truxal. The control unit 28, a more detailed description of which will be given in the following, causes these numbers to be fed to the arithmetical unit 27.

The arithmetical unit 27 is designed in a conventional manner to carry out the simple mathematical operations of addition, subtraction, multiplication, and division. The magnitudes which are to be subjected to such mathematical operations are taken either from the input unit 31 or from the memory unit 30. The result is sent either to the memory unit 30 or to the output unit 32. The arithmetical unit 27 may be controlled either as stated by the control unit 28, or in accordance with methods known for the purpose.

In the program unit 29, there are stored orders which in a codified form indicate where the number which is to be subjected to the operation should be obtained, which operation is to be carried out, and where the result is to be sent. The orders in the program unit 29 are stored in the sequence in which they are to be carried out.

The control unit 28 reads off and interprets one after the other the order in the program unit 29 and causes the arithmetical unit 27 and the input unit 31 successively to carry out the operations desired.

In the unit 22′ in the program unit 29 the orders are stored which correspond to the mathematical operations which, according to the block diagram 2, the unit 22 has to carry out. Orders are then first given to obtain the binary number which corresponds to the coordinate $x$ from the input unit 31. Thereafter a division is ordered by the quantity corresponding to the distance R, which is also obtained from the input unit. The result, which corresponds to the component $e_{1x}$ of the unit vector, is sent to the memory unit 30. The corresponding operations are carried out for the other two coordinates in the $y$ and $z$ directions. In the unit 24′ in the program unit, there are stored the orders which correspond to the mathematical operations which the coordinate converter 23 according to the block diagram in FIGURE 2 has to carry out. The calculation of the sine functions are then carried out in a known manner with a power series according to the equation:

$$\sin v = A_1 \cdot v + A_3 \cdot v^3 + A_5 \cdot v^5 + A_7 \cdot v^7$$

where $A_1$, $A_3$ etc. are constants, and where $v$ is the angle.

The calculations of the cosine functions are fed back to the calculation of the sine function according to the equation $$\cos v + \sin\left(v + \frac{\pi}{2}\right)$$

Examples of how calculations of trigonometrical functions are carried out in digital computers with the aid of series may be found e.g. on pages 138–140 of the book "Approximations for Digital Computers," Princeton, 1957, by C. Hastings, Jr. The result of the sine and cosine calculations for the angles of elevation and traverse are stored in the memory unit 30, and also the components of the unit vector $\bar{e}_2$ calculated therefrom. The units 23′ and 25′ have the orders stored which correspond to the mathematical operations which the differential unit 23 and the component divider 25 according to the block diagram in FIGURE 2 are to carry out. These operations are carried out in the manner corresponding to the operations described above, and the values for sine and cosine for the angles of traverse and elevation stored in the memory unit 30 are then used. The final results $f_S'$ and $f_H'$ are sent to the output unit 32.

The converter converts the numbers sent from the arithmetical unit into electric voltages. These voltages are then transmitted to the inputs, respectively, of the servo amplifiers 16 and 21.

In the control unit, there is also a sampling generator 33, which at certain time intervals causes the machine to obtain new input values from the input unit 31 and carry out from these values a complete calculation of $f_S'$ and $f_H'$. The error signals will therefore be supplied to the servo amplifier intermittently, and the servo system will thus be of a sampling type.

In the unit 22 in the block diagram 2, division by R may be omitted, or a multiplication with a factor can be effected which makes the coordinate values greater or smaller. The coordinate converter 24 should have such properties that it delivers a vector of the same length as the one supplied from the unit 22. In case the difference vector is too large or too small, it is appropriate to have the component divider 25 provided with a multiplying member which gives the difference vector an apppropriate length.

What is claimed is:

1. A servo system for controlling the movement and position of a controlled member from a remote control member, each of said two members being movable into two directions at a right angle to each other, the controlled member being provided with drive means for moving the same, one drive means being provided for each of said directions, and further provided with indicating means for each direction to indicate the position of said member in the respective direction, said servo system comprising, in combination, means supplying pilot signals to the servo system to control the setting thereof, said signal representing a vector and being controlled by the control member, a coordinate converter connected to and controlled by said two indicating means to deliver signals representing a second vector having the same length as the first vector and oriented corresponding to the position indications supplied by said indicating means, a differential means connected to the coordinate converter and the control member to produce signals representing a differential vector, and a component divider connected to the differential means to divide the differential vector produced in said means into two components each indicative of one of the two directions of movement, said component divider being connected to both said drive means to feed to one drive means the one vector component and to the other drive means the other vector component to cause said drive means to move the controlled member in both directions in accordance with said vector components.

2. A servo system according to claim 1 wherein a first multiplication means is arranged between the control member and the differential means, said multiplication means multiplying the vector supplied to said means to alter the length thereof.

3. A servo system according to claim 2 wherein the coordinate converter is arranged to form a vector which has the same length as the altered vector.

4. A servo system according to claim 2 wherein a second multiplication means is arranged between the differential means and the component divider, said second multiplication means multiplying the differential vector supplied to it to alter the length of said vector.

References Cited in the file of this patent

UNITED STATES PATENTS 2,660,793   Holschuh et al. _____ Dec. 1, 1953